US007530449B2

(12) United States Patent
Nakashima et al.

(10) Patent No.: US 7,530,449 B2
(45) Date of Patent: May 12, 2009

(54) CONVEYANCE APPARATUS

(75) Inventors: Atsuhisa Nakashima, Nagoya (JP); Naoki Hishida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 137 days.

(21) Appl. No.: 11/678,664

(22) Filed: Feb. 26, 2007

(65) Prior Publication Data

US 2007/0201936 A1 Aug. 30, 2007

(30) Foreign Application Priority Data

Feb. 27, 2006 (JP) ............................ 2006-050090

(51) Int. Cl.
*B65G 43/00* (2006.01)
*B41J 13/08* (2006.01)

(52) U.S. Cl. ............................ 198/810.03; 198/689.1; 271/276; 347/104

(58) Field of Classification Search ............ 198/810.01, 198/810.03, 689.1; 271/276; 347/16, 104
See application file for complete search history.

(56) References Cited

U.S. PATENT DOCUMENTS 6,106,090 A 8/2000 Uchida et al.
7,416,074 B2 * 8/2008 Otomo et al. .......... 198/810.03
2005/0085945 A1 * 4/2005 Andoh et al. ............... 700/230
2007/0144871 A1 * 6/2007 Tao et al. ............... 198/810.03

FOREIGN PATENT DOCUMENTS

| | | | |
|---|---|---|---|
| JP | H05-092632 | A | 4/1993 |
| JP | H05-297737 | A | 11/1993 |
| JP | 2000-019860 | A | 1/2001 |

* cited by examiner

*Primary Examiner*—Mark A Deuble
(74) *Attorney, Agent, or Firm*—Baker Botts L.L.P.

(57) ABSTRACT

A conveyance apparatus includes a platen having a flat supporting surface that supports a conveyor belt, from its inside, being stretched between first and second rollers. The apparatus further includes an encoder roller disposed between the first roller and the platen so as to be in contact with the conveyor belt from its inside, and a rotary encoder that follows the encoder roller to rotate. The belt is inclined between the first roller and the platen so as to form an obtuse angle with the supporting surface. A contact position between the encoder roller and the belt is in between a first imaginary plane including the supporting surface, and a second imaginary plane spreading through the nearer one, to the first roller, of both ends of the supporting surface in a direction of conveyance by the belt on the supporting surface.

5 Claims, 5 Drawing Sheets

CONVEYANCE APPARATUS

CROSS-REFERENCE TO RELATED APPLICATION

This application claims priority to and the benefit of Japanese Patent Application No. 2006-050090 filed on Feb. 27, 2006, the disclosure of which is incorporated herein by reference.

BACKGROUND OF THE INVENTION

1. Field of the Invention

The present invention relates to a conveyance apparatus for conveying a conveyance object with an endless conveyor belt.

2. Description of Related Art

Japanese Patent Unexamined Publication No. Hei 5-297737 discloses an inkjet printer including therein a conveyance apparatus having an endless conveyor belt being stretched between a drive roller and a slave roller. In the inkjet printer, an inkjet head ejects ink onto a paper being conveyed by the conveyance apparatus, to form a desired image on the paper. In this case, the resolution of the formed image in a conveyance direction of the paper depends on the conveyance accuracy of the conveyance apparatus. To form the image with a high degree of accuracy, therefore, it is necessary to accurately control the quantity of the conveyance of the paper. In the conveyance apparatus of the above publication, the conveyor belt is pinched by an encoder roller to which a rotary encoder is attached, and a pressing roller being biased toward the encoder roller. The drive of the conveyor belt is controlled on the basis of the rotational position of the encoder roller detected by the rotary encoder. In this manner, the rotary encoder can directly detect the quantity of the drive of the conveyor belt, and therefore, the conveyance quantity of the paper can be controlled on the basis of the drive quantity of the conveyor belt.

In the above-described conveyance apparatus, however, a deflection portion generated in the conveyor belt oscillates perpendicularly to the conveyance surface of the conveyor belt. The oscillation of the deflection portion may cause instantaneous displacement of the pressing roller. The instantaneous displacement of the pressing roller causes an instantaneous change in the pressing force of the pressing roller to the conveyor belt. The change in the pressing force of the pressing roller causes a sharp change in the contact pressure of the conveyor belt to the encoder roller. As a result, the encoder roller can not follows the movement of the conveyor belt, and the rotary encoder can not accurately read the conveyance quantity of the paper.

SUMMARY OF THE INVENTION

An object of the present invention is to provide a conveyance apparatus wherein the quantity of conveyance can accurately be read.

According to a first aspect of the present invention, a conveyance apparatus comprises an endless conveyor belt wrapped on outer circumferential surfaces of a first roller and a second roller to be stretched between the first and second rollers; a platen disposed between the first and second rollers and having a flat supporting surface that supports the conveyor belt from the inside of the conveyor belt; an encoder roller disposed between the first roller and the platen so as to be in contact with the conveyor belt from the inside of the conveyor belt; and a rotary encoder that follows the encoder roller to rotate for detecting the quantity of conveyance. The conveyor belt is inclined relative to the supporting surface of the platen between the first roller and the platen so as to form an obtuse angle with the supporting surface of the platen. A contact position between the encoder roller and the conveyor belt is in between a first imaginary plane including the supporting surface of the platen, and a second imaginary plane spreading through the nearer one, to the first roller, of both ends of the supporting surface of the platen in a direction of conveyance by the conveyor belt on the supporting surface of the platen.

According to the first aspect of the invention, the conveyor belt is in a state of being pulled by the encoder roller in the direction from the second imaginary plane toward the first imaginary plane. Therefore, even when oscillation is generated due to deflection of the conveyor belt, the conveyor belt is hard to separate from the encoder roller. Thus, the quantity of conveyance by the conveyor belt can accurately be read. In addition, the conveyor belt being pulled by the encoder roller does not separate from the supporting surface of the platen.

According to a second aspect of the present invention, a conveyance apparatus comprises an endless conveyor belt wrapped on a first guide member and a second guide member to be stretched between the first and second guide members; an encoder roller disposed between the first and second guide members so as to be in contact with the conveyor belt from the inside of the conveyor belt; and a rotary encoder that follows the encoder roller to rotate. A contact position between the encoder roller and the conveyor belt is opposite the first and second guide members behind an imaginary plane that is a common tangent plane of the first and second guide members and crosses the conveyor belt in parallel with a lateral direction of the conveyor belt.

According to the second aspect of the invention, the conveyor belt is in a state of being pulled by the encoder roller to the opposite side of the imaginary plane to the first and second guide members. Therefore, even when oscillation is generated due to deflection of the conveyor belt, the conveyor belt is hard to separate from the encoder roller. Thus, the quantity of conveyance by the conveyor belt can accurately be read.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
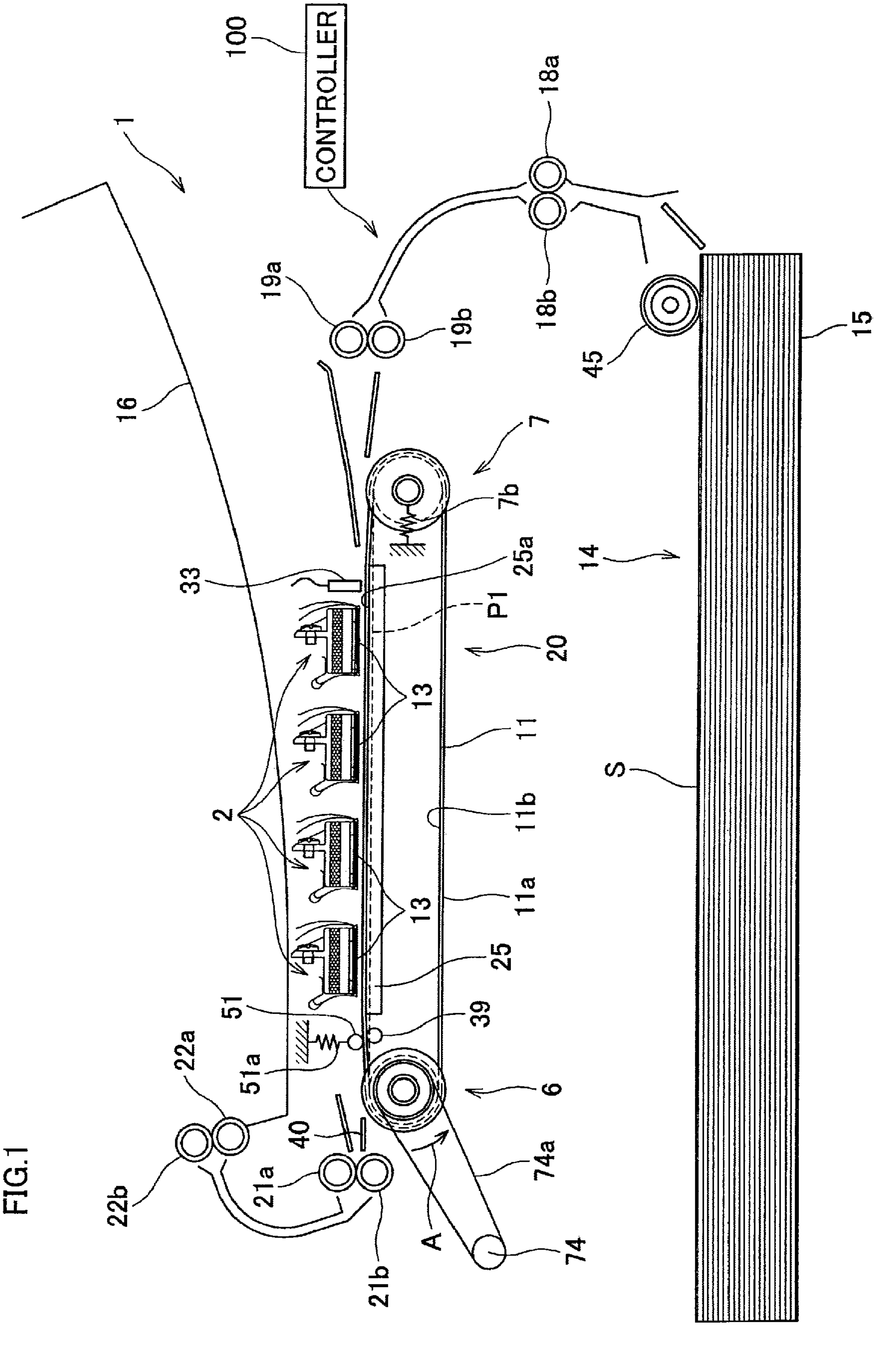
FIG. 1 shows a general construction of a printer including therein a conveyance apparatus according to an embodiment of the present invention.

Hereinafter, a preferred embodiment of the present invention will be described with reference to the accompanying drawings. FIG. 1 shows a general construction of a printer including therein a conveyance apparatus according to the embodiment.

The printer 1 shown in FIG. 1 is a line type color inkjet printer having four inkjet heads each having a rectangular profile extending perpendicularly to FIG. 1. As shown in FIG. 1, the printer 1 includes therein a conveyance apparatus 20 disposed under the inkjet heads 2; a paper feeder 14 disposed under the conveyance apparatus 20; and a paper receiver 16 disposed over the inkjet heads 2. The printer 1 further includes a controller 100 that controls the operations of those components of the printer 1.

The paper feeder 14 includes a paper container 15 in which a stack of printing papers S can be contained; and a paper feed roller 45 that sends out the uppermost printing paper S in the paper container 14 one by one toward the conveyance apparatus 20. In the paper container 15, each printing paper S is put so that it is sent out parallel to its long sides. Between the paper container 15 and the conveyance apparatus 20, feed rollers 18*a*, 18*b*, 19*a*, and 19*b* are disposed along the conveyance path of the printing papers S. Any of the paper feed roller 45 and the feed rollers 18*a*, 18*b*, 19*a*, and 19*b* is under the control of the controller 100. Under the control of the controller 100, each printing paper S taken out of the paper feeder 14 is pinched by the feed rollers 18*a* and 18*b* and sent upward in FIG. 1 with one short side of the printing paper S being set as the leading edge. The printing paper S is then pinched by the feed rollers 19*a* and 19*b* and sent leftward in FIG. 1 toward the conveyance apparatus 20.

The conveyance apparatus 20 includes an endless conveyor belt 11; a drive roller 6 and a slave roller 7 on each of which the conveyor belt 11 is wrapped so as to be stretched between the rollers; and a platen 25 disposed between the drive roller 6 and the slave roller 7 and has a flat supporting surface 25*a* that supports the inner circumferential surface 11*b* of the conveyor belt 11. The drive roller 6 and the slave roller 7 are disposed so that a straight line extending through the rotational centers of the rollers is horizontal. As shown in FIG. 1, the supporting surface 25*a* of the platen 25 is in contact with the upper side portion of portions of the inner circumferential surface 11*b* of the conveyor belt 11 opposite to each other between the drive roller 6 and the slave roller 7. Portions of the respective drive roller 6 and slave roller 7 on which the conveyor belt 11 is wrapped have the same diameter. The platen 25 is disposed so that its supporting surface 25*a* is horizontal.

The outer circumferential surface 11*a* of the conveyor belt 11 is opposed to the inkjet heads 2 at the portion of the conveyor belt 11 being supported by the platen 25. Each printing paper S sent from the paper feeder 14 is put on the outer circumferential surface 11*a* of the conveyor belt 11. The drive roller 6 is driven to rotate in the direction shown by an arrow A in FIG. 1, that is, counterclockwise. Thus, the conveyor belt 11 is driven counterclockwise in FIG. 1. That is, the conveyor belt 11 is moved on the supporting surface 25*a* of the platen 25 in the direction from the slave roller 7 toward the drive roller 6. Thereby, the printing paper S put on the conveyor belt 11 is conveyed leftward in FIG. 1. The inkjet heads 2 then perform printing on the printing paper S being conveyed by the conveyor belt 11. Details of the conveyance apparatus 20 will be described later.

As described above, the inkjet heads 2 form an image on the printing paper S put on the portion of the conveyor belt 11 being supported by the platen 25. Therefore, if the conveyor belt 11 separates from the supporting surface 25*a* of the platen 25, then the formed image is lowered in quality. For this reason, the conveyor belt 11 is preferably driven with being in close contact with the supporting surface 25*a* of the platen 25.

Each of four inkjet heads 2 has at its lower end a head main body 13. Each head main body 13 has a slender rectangular parallelepiped shape in plan view extending perpendicularly to FIG. 1. Four head main bodies 13 arranged close to each other in the direction of the conveyance of the printing paper S by the conveyance apparatus 20, that is, horizontally in FIG. 1. A large number of nozzles each having a very small diameter are provided on the bottom face of each head main body 13, which face serves as an ink ejection face. Four head main bodies 13 eject inks different in color. Each head main body 13 ejects ink of one color of magenta (M), yellow (Y), cyan (C), and black (K) That is, the nozzles of one head main body 13 eject ink of the same color. The ejection timing for ink is controlled by the controller 100.

A narrow space is formed between the bottom face of each head main body 13 and the conveyor belt 11. Each printing paper S is conveyed from the right to the left in FIG. 1 through the space. While the printing paper S passes under four head main bodies 13 in order, the nozzles of each head main body 13 eject ink onto the upper surface of the printing paper S to form a desired color image on the printing paper S.

A peeling plate 40 is provided near the outer circumferential surface 11*a* of the conveyor belt 11 at a portion being wrapped on the drive roller 6, more specifically, a portion in contact with the upper end of the drive roller 6, that is, a left portion of the conveyor belt 11 in FIG. 1. The front end of the peeling plate 40 is inserted between the printing paper S and the outer circumferential surface 11*a* of the conveyor belt 11, and thereby the peeling plate 40 peels off, from the conveyor belt 11, the printing paper S put on the conveyor belt 11 and conveyed from the right to the left in FIG. 1.

A number of printing papers S on which printing has been performed are stacked on the paper receiver 16. Between the conveyance apparatus 20 and the paper receiver 16, feed rollers 21*a*, 21*b*, 22*a*, and 22*b*, which are under the control of the controller 100, are disposed along the conveyance path of the printing papers S. Under the control of the controller 100, each printing paper S sent out from the conveyance apparatus 20 is pinched by the feed rollers 21*a* and 22*b* and sent upward in FIG. 1 with one short side of the printing paper S being set as the leading edge. The printing paper S is then pinched by the feed rollers 22*a* and 22*b* and sent to the paper receiver 16.

As shown in FIG. 1, a paper sensor 33 is disposed above the conveyor belt 11. More specifically, of both ends, in the conveyance direction, of the portion of the conveyor belt 11 being supported by the platen 25, the paper sensor 33 is disposed in the vicinity of the end nearer to the slave roller 7, that is, the right end in FIG. 1. The paper sensor 33 is an optical sensor constituted by a light emitting element and a light receiving element. The light emitting element emits a light toward a detection position on the conveyor belt 11, and the light receiving element receives a reflected light. The level of the output signal of the paper sensor 33 reflects the difference in the intensity of the reflected light due to whether or not a printing paper S exists on the detection position. That is, at the time when the level of the output signal of the paper sensor 33 sharply increases, the leading edge of a printing paper S reaches the detection position. When detecting the leading edge of a printing paper S, the paper sensor 33 sends a detection signal to the controller 100. The controller 100 having received the detection signal from the paper sensor 33 sends a printing start signal to each inkjet head 2.

Figure 2:
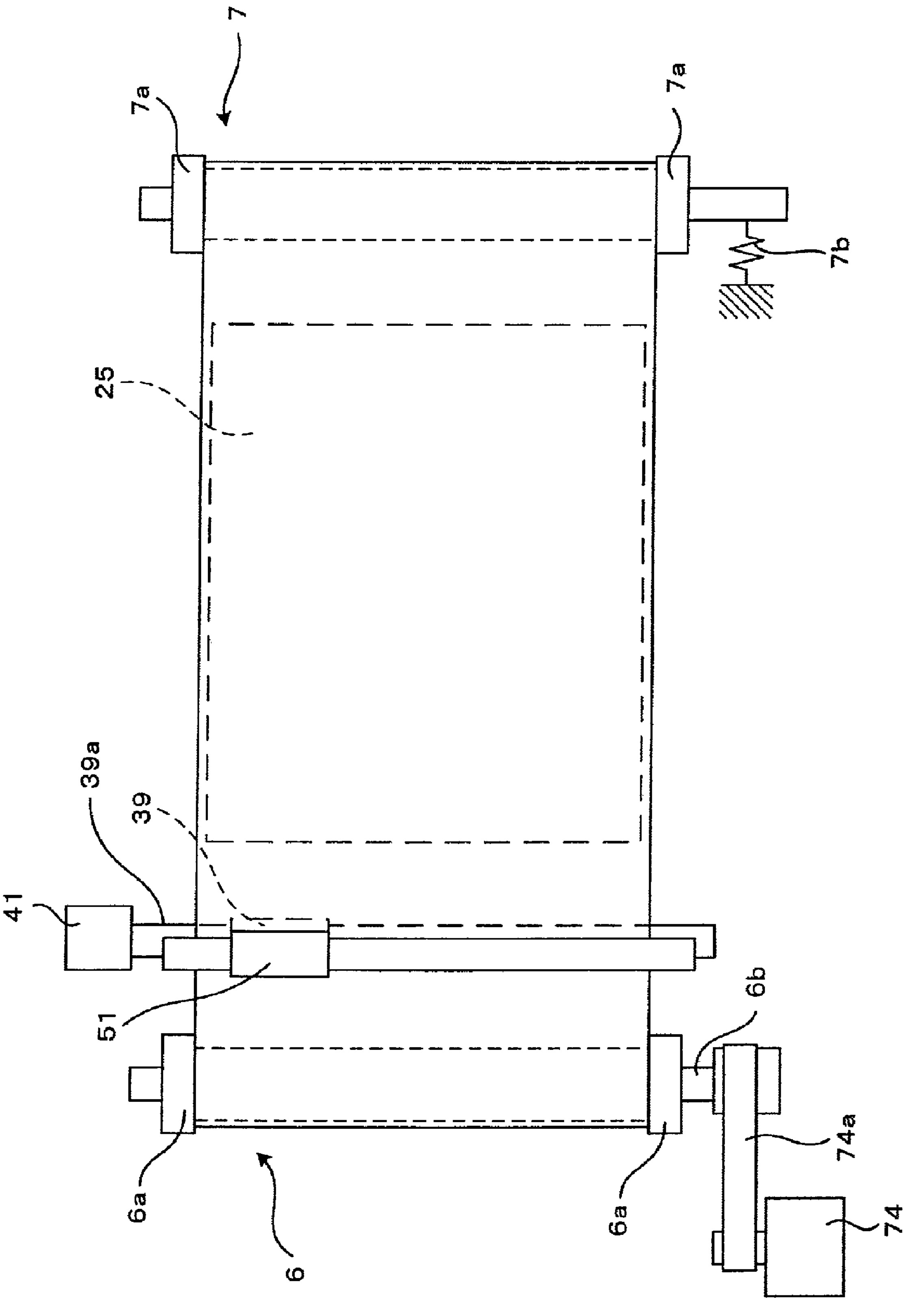
FIG. 2 is a plan view of the conveyance apparatus of FIG. 1 when viewed from the inkjet head side.
Figure 3:
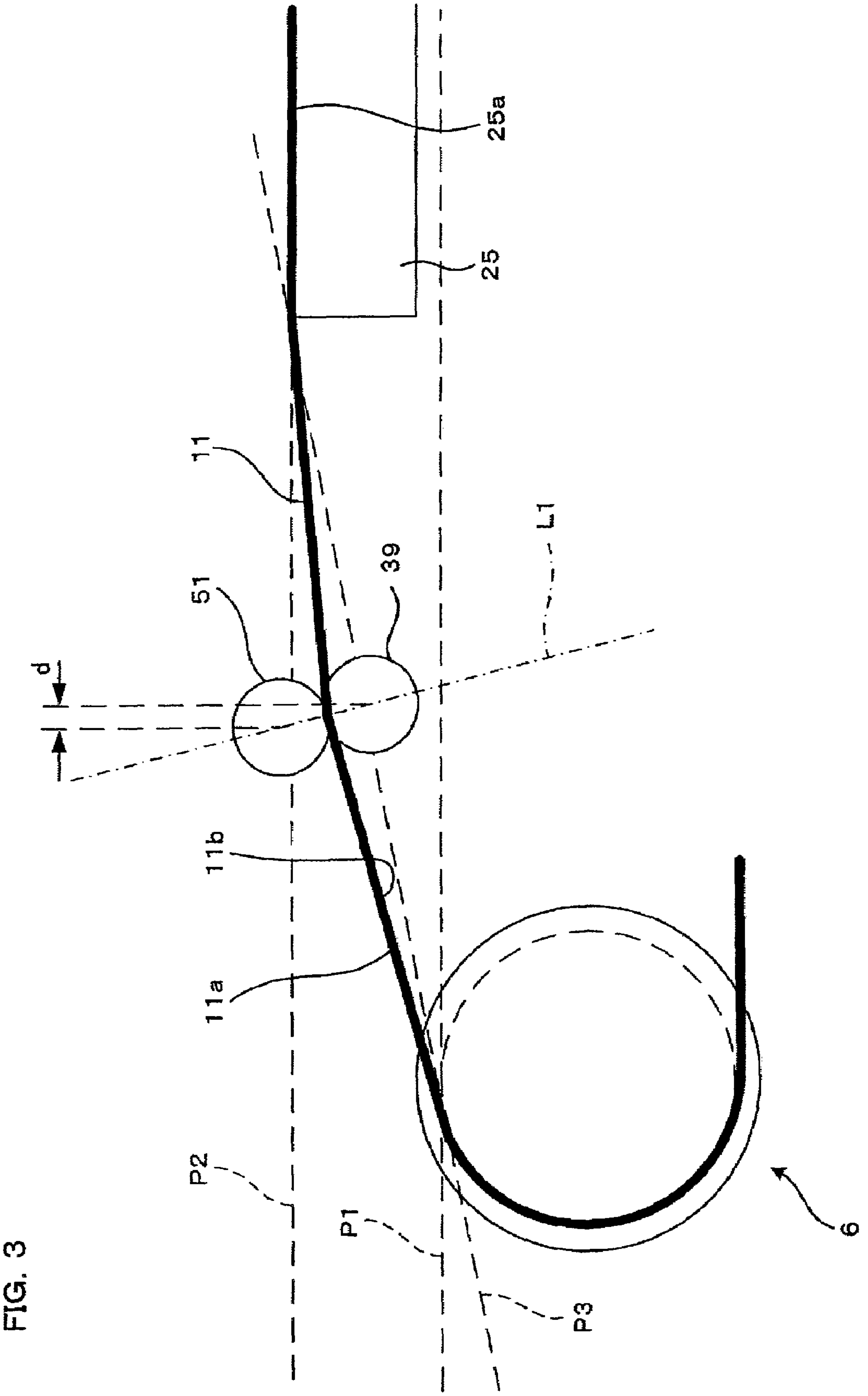
FIG. 3 is an enlarged view of a portion of the conveyance apparatus near a drive roller and a platen shown in FIG. 1.

Next, the conveyance apparatus 20 will be described in more detail also with reference to FIGS. 2 and 3. FIG. 2 is a plan view of the conveyance apparatus 20 when viewed from the inkjet heads 2 side. FIG. 3 is an enlarged view of a portion of the conveyance apparatus 20 near the drive roller 6 and the platen 25 shown in FIG. 1.

Either of the drive roller 6 and the slave roller 7 extends laterally of the conveyor belt 11 to be across the conveyor belt 11. Both of the drive roller 6 and the slave roller 7 are in contact with the inner circumferential surface 11*b* of the conveyor belt 11. As shown in FIG. 2, the drive roller 6 has at both ends two flanges 6*a* larger in diameter than the portion of the drive roller 6 that is in contact with the conveyor belt 11. The interval between the flanges 6*a* is substantially equal to the lateral length of the conveyor belt 11. Likewise, the slave roller 7 also has at both ends two flanges 7*a* at an interval substantially equal to the lateral length of the conveyor belt 11. The conveyor belt 11 is wrapped on the portion of the drive roller 6 between the flanges 6*a* and the portion of the slave roller 7 between the flanges 7*a*. Thereby, lateral movement of the conveyor belt 11 is stopped by the flanges 6*a* and 7*a* of the drive roller 6 and the slave roller 7. Thus, the conveyor belt 11 is longitudinally driven without meandering.

The drive roller 6 is provided coaxially with a rotary shaft 6*b* to which a driving force of a conveyance motor 74 is transmitted via a transmission belt 74*a*. The conveyance motor 74 is under the control of the controller 100. Therefore, by driving the conveyance motor 74 under the control of the controller 100, the drive roller 6 is driven to rotate. The slave roller 7 is rotated by a rotational force given by the conveyor belt 11 with the rotation of the drive roller 6.

As shown in FIGS. 1 and 2, the slave roller 7 is being biased by a biasing spring 7*b* so as to get away from the drive roller 6, that is, rightward in FIGS. 1 and 2. Thereby, a tension of a predetermined intensity is being applied to the conveyor belt 11 longitudinally of the conveyor belt 11.

Now, a reference plane P1 is defined as an imaginary plane tangent to the respective outer circumferential surfaces of the drive roller 6 and the slave roller 7 at the points nearest to the inkjet heads 2. In this case, as shown in FIG. 1, the supporting surface 25*a* of the platen 25 is parallel to the conveyance path for printing papers on the conveyor belt 11. In addition, the supporting surface 25*a* of the platen 25 is on the opposite side of the reference plane P to the rollers 6 and 7. That is, between the drive roller 6 and the platen 25 and between the slave roller 7 and the platen 25, the conveyor belt 11 is inclined relative to the supporting surface 25*a* of the platen 25 so as to form an obtuse angle with the supporting surface 25*a*. In addition, as described above, a tension of a predetermined intensity is being applied to the conveyor belt 11 longitudinally of the conveyor belt 11. Therefore, the conveyor belt 11 is moved on the supporting surface 25*a* of the platen 25 with frictioning.

Between the drive roller 6 and the platen 25, an encoder roller 39 is disposed so as to be in contact with the inner circumferential surface 11*b* of the conveyor belt 11. When viewed from the above, the encoder roller 39 extends laterally of the conveyor belt 11 to be across the conveyor belt 11. A rotary encoder 41 is provided on a rotary shaft 39*a* of the encoder roller 39. The rotary encoder 41 is rotated integrally with the encoder roller 39 to detect the rotational quantity of the encoder roller 39. Further, a pressing roller 51 is disposed on the opposite side of the conveyor belt 11 to the encoder roller 39. The pressing roller 51 presses the outer circumferential surface 11*a* of the conveyor belt 11 by a biasing force of a biasing spring 51*a* to press the conveyor belt 11 onto the encoder roller 39. The rotary encoder 41 outputs to the controller 100 a detection signal that indicates the rotational quantity of the encoder roller 39. On the basis of the detection signal output from the rotary encoder 41, the controller 100 detects the paper conveyance quantity by the conveyor belt 11. In accordance with the detected paper conveyance quantity, the controller 100 controls the conveyance motor 74 and the inkjet heads 2.

Now, as shown in FIG. 3, a reference plane P2 is defined as an imaginary plane including the supporting surface 25*a* of the platen 25. Further, a reference plane P3 is defined as an imaginary plane tangent to the drive roller 6, spreading through the nearer one to the drive roller 6 of both ends of the supporting surface 25*a* of the platen 25 in the conveyance direction of the conveyor belt 11 on the supporting surface 25*a*. In this case, the contact point between the encoder roller 39 and the conveyor belt 11 is in between the reference planes P2 and P3. A straight line L1, as shown by an alternate long and short dash line in FIG. 3, extending through the rotational center of the encoder roller 39 and the rotational center of the pressing roller 51, is perpendicular to the reference plane P3. In this embodiment, the horizontal d between the rotational center of the encoder roller 39 and the rotational center of the pressing roller 51 is approximately 0.15 mm or less.

As described above, in the conveyance apparatus 20 of this embodiment, the conveyor belt 11 is inclined relative to the supporting surface 25*a* of the platen 25 between the drive roller 6 and the platen 25 so as to form an obtuse angle with the supporting surface 25*a*. In addition, the contact position between the encoder roller 39 and the conveyor belt 11 is in between the reference planes P2 and P3. Therefore, the conveyor belt 11 is in a state of being pulled by the encoder roller 39 in the direction from the plane P3 toward the plane P2. As a result, when oscillation is generated due to deflection of the conveyor belt 11, the conveyor belt 11 is hard to separate from the encoder roller 39. Therefore, the paper conveyance quantity by the conveyor belt 11 can accurately be read. In addition, the conveyor belt 11 being pulled by the encoder roller 39 does not separate from the supporting surface 25*a* of the platen 25. This prevents adverse effects on an image to be formed on a printing paper S put on the portion of the conveyor belt 11 being supported by the supporting surface 25*a* of the platen 25.

The conveyance apparatus 20 of this embodiment includes the pressing roller 51 disposed opposite the encoder roller 39 behind the conveyor belt 11. The pressing roller 51 presses the outer circumferential surface 11*a* of the conveyor belt 11 to press the conveyor belt 11 onto the encoder roller 39. Thus, by the biasing force of the pressing roller 51, the contact between the conveyor belt 11 and the encoder roller 39 is made surer.

In the conveyance apparatus 20 of this embodiment, the encoder roller 39 and the pressing roller 51 are disposed such that the straight line L1 extending through the respective rotational centers of the encoder roller 39 and the pressing roller 51 is perpendicular to the reference plane P3. Although the measurement error due to the thickness of the conveyor belt 11 increases as the contact area between the encoder roller 39 and the conveyor belt 11 increases, the contact area between the encoder roller 39 and the conveyor belt 11 is reduced to the degree of point contact in this embodiment. This decreases the measurement error due to the thickness of the conveyor belt 11.

In the conveyance apparatus 20 of this embodiment, the endless conveyor belt 11 is wrapped on the drive roller 6 and the slave roller 7. The drive roller 6 is driven to rotate by the driving force of the conveyance motor 74. The encoder roller 39 is disposed between the drive roller 6 and the platen 25. The conveyor belt 11 is moved on the supporting surface 25*a* of the platen 25 in the direction from the slave roller 7 toward the drive roller 6. Therefore, the deflection of the upper one of the portions of the conveyor belt 11 opposite to each other between the drive roller 6 and the slave roller 7, that is, the deflection of the portion of the conveyor belt 11 being supported by the platen 25, is less than the deflection of the lower portion of the conveyor belt 11. That is, the oscillation generated on the upper portion of the conveyor belt 11 is relatively little. In this embodiment, because the encoder roller 39 is disposed for the upper portion of the conveyor belt 11, the contact between the conveyor belt 11 and the encoder roller 39 becomes surer. In addition, because the platen 25 is also provided for the upper portion of the conveyor belt 11, the contact of the conveyor belt 11 with the platen 25 is improved.

Figure 4:
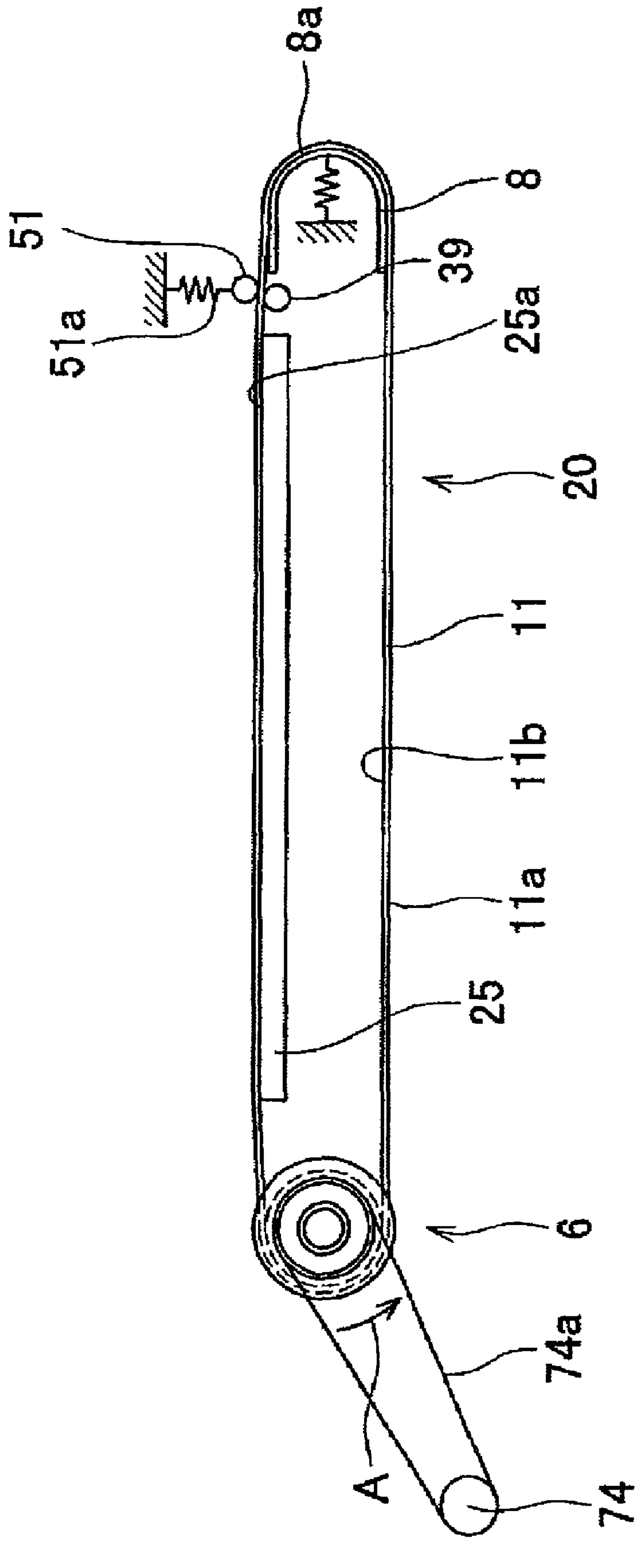
FIG. 4 shows a conveyance apparatus according to a modification of the present invention.
Figure 5:
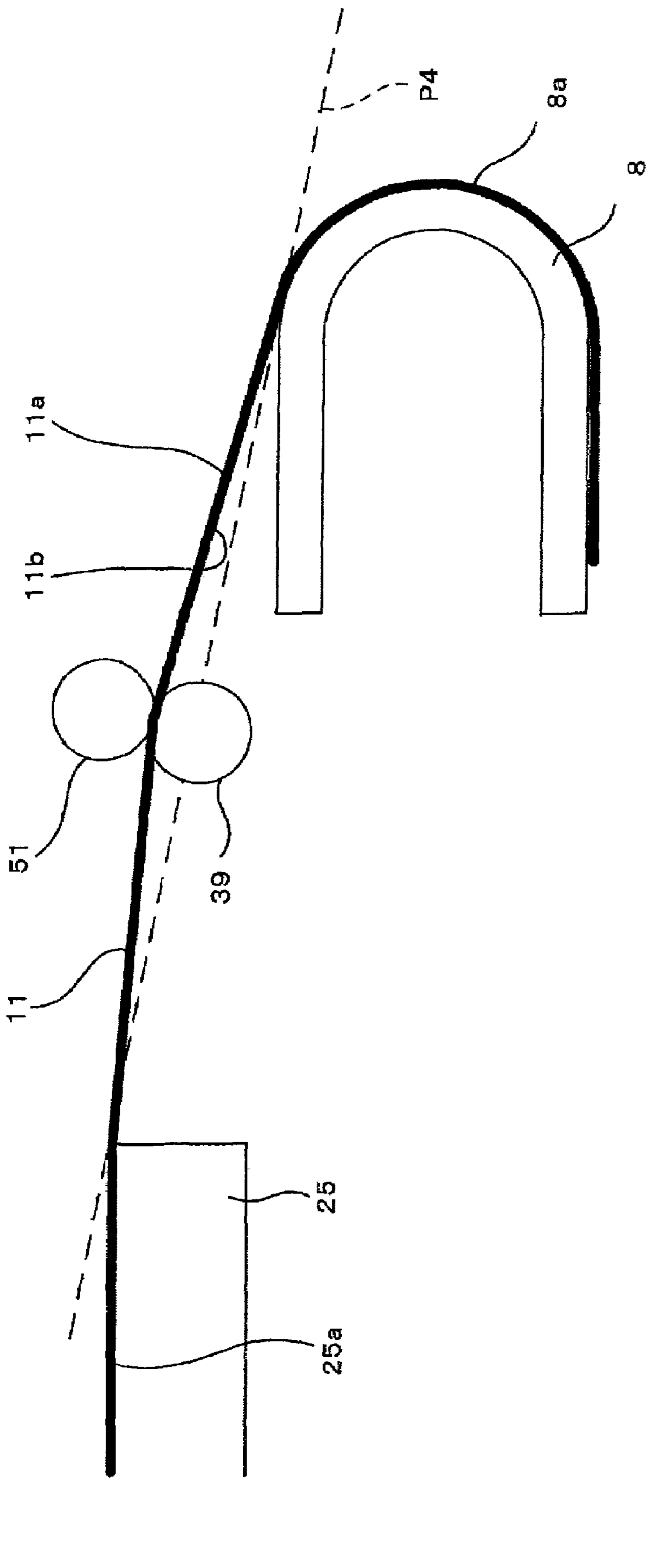
FIG. 5 is an enlarged view of a portion of the conveyance apparatus near a guide member and a platen shown in FIG. 4.

In the embodiment, the endless conveyor belt 11 is wrapped on the drive roller 6 and the slave roller 7, and the encoder roller 39 is disposed between the drive roller 6 and the platen 25. However, the present invention is not limited to that. For example, the encoder roller 39 may be disposed between the slave roller 7 and the platen 25. For example, in addition, a guide member 8 nearly U-shaped in section may be disposed instead of the slave roller 7 of the above-described embodiment, as shown in FIG. 4. In this case, the conveyor belt 11 is wrapped on a curved portion of the guide member 8, and the encoder roller 39 is disposed between the guide member B and the platen 25. Here, as shown in FIG. 5 which is a partial enlarged view of FIG. 4, a common tangent plane of a guide surface 8*a* of the guide member B and a supporting surface 25*a* of the platen 25 is referred to as a reference plate P4. In this case, a contact point of the encoder roller 39 with the conveyor belt 11 exists on an opposite side of the reference plate P4 to the guide member 8 and the platen 25. Thereby, like the embodiment, the conveyor belt 11 is hard to separate from the encoder roller 39, and the conveyance quantity by the conveyor belt 11 can accurately be read.

In the embodiment, the endless conveyor belt 11 is wrapped on two rollers of the drive roller 6 and the slave roller 7. However, the conveyor belt 11 may be wrapped on three or more rollers.

In the embodiment, the pressing roller 51 is provided opposite the encoder roller 39 behind the conveyor belt 11. The pressing roller 51 presses the outer circumferential surface 11*a* of the conveyor belt 11 to press the conveyor belt 11 onto the encoder roller 39. However, such a pressing roller 51 may not be provided.

In the embodiment, the rotary encoder 41 is provided on the rotary shaft 39*a* of the encoder roller 39 to rotate as one body. However, the present invention is not limited to that. For example, the encoder roller 39 and the rotary encoder 41 may have gears provided on the respective rotational axes and engaged with each other. Thus, any construction can be employed as far as the rotary encoder 41 follows the encoder roller 39 to rotate with a rotational quantity proportional to the rotational quantity of the encoder roller 39.

In the embodiment, the encoder roller 39 and the pressing roller 51 are disposed such that the straight line L1 extending through the respective rotational centers of the encoder roller 39 and the pressing roller 51 is perpendicular to the reference plane P3. However, the present invention is not limited to that. The straight line L1 may not be perpendicular to the plane P3.

In the embodiment, the conveyor belt 11 is moved on the supporting surface 25*a* of the platen 25 in the direction from the slave roller 7 toward the drive roller 6. However, the present invention is not limited to that. The conveyor belt 11 may be moved on the supporting surface 25*a* of the platen 25 in the direction from the drive roller 6 toward the slave roller 7.

In the embodiment, the conveyance apparatus 20 is provided in an inkjet printer for conveying printing papers S. However, the present invention is not limited to that. For example, the conveyance apparatus 20 may be provided in another type of a printer than the inkjet type, for example, a laser printer.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A conveyance apparatus comprising:

an endless conveyor belt wrapped on outer circumferential surfaces of a first roller and a second roller to be stretched between the first and second rollers;

a platen disposed between the first and second rollers and having a flat supporting surface that supports the conveyor belt from the inside of the conveyor belt, wherein the flat supporting surface comprises a first end and a second end opposite the first end, and the first end is positioned closer to the first roller than the second end;

an encoder roller disposed between the first roller and the platen so as to be in contact with the conveyor belt from the inside of the conveyor belt; and a rotary encoder that follows the encoder roller to rotate for detecting the quantity of conveyance, wherein at least a portion of the conveyor belt is inclined relative to the supporting surface of the platen between the first roller and the platen so as to form an obtuse angle with the supporting surface of the platen, wherein the encoder roller and the conveyor belt contact at a contact position located between a first imaginary plane including the supporting surface of the platen, and a second imaginary plane formed by spreading through the first end of the supporting surface of the platen and a tangent of the first roller.

2. The apparatus according to claim 1, further comprising a pressing roller disposed opposite the encoder roller behind the conveyor belt to press the conveyor belt from the outside of the conveyor belt onto the encoder roller.

3. The apparatus according to claim 2, wherein the encoder roller and the pressing roller are disposed such that a straight line extending through respective rotational centers of the rollers is perpendicular to the second imaginary plane.

4. The apparatus according to claim 1, wherein the first roller is a drive roller that drives the conveyor belt, and the conveyor belt is moved on the supporting surface of the platen in a direction from the second roller toward the first roller.

5. A conveyance apparatus comprising:

an endless conveyor belt wrapped on a first guide member and a second guide member to be stretched between at least the first and second guide members;

an encoder roller disposed between the first and second guide members so as to be in contact with the conveyor belt from the inside of the conveyor belt; and a rotary encoder that follows the encoder roller to rotate, wherein the encoder roller and the conveyor belt contact at a contact position which is located on an opposite side of an imaginary plane from the first and second guide members, wherein the imaginary plane is a common tangent plane of the first and second guide members and crosses the conveyor belt in parallel with a lateral direction of at least a portion of the conveyor belt.

* * * * *